(12) United States Patent
Keller et al.

(10) Patent No.: US 9,582,626 B1
(45) Date of Patent: Feb. 28, 2017

(54) USING WAVEFORM PROPAGATION FOR ACCURATE DELAY CALCULATION

(71) Applicant: Cadence Design Systems, Inc., San Jose, CA (US)

(72) Inventors: Igor Keller, Pleasanton, CA (US); Eddy Pramono, Santa Clara, CA (US); Jijun Chen, San Jose, CA (US); Nikolay Rubanov, Morgan Hill, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/549,424

(22) Filed: Nov. 20, 2014

(51) Int. Cl.
*G06F 17/50* (2006.01)

(52) U.S. Cl.
CPC .................. *G06F 17/5045* (2013.01)

(58) Field of Classification Search
CPC .................. G06F 17/5036; G06F 2217/84
USPC .................................. 716/108, 113
See application file for complete search history.

(56) References Cited

U.S. PATENT DOCUMENTS

| | | | | |
|---|---|---|---|---|
| 7,983,891 B1* | 7/2011 | Keller | ............... | G06F 17/5036 703/19 |
| 2005/0039151 A1* | 2/2005 | Levy | ............... | G06F 17/5031 716/113 |
| 2009/0193373 A1* | 7/2009 | Abbaspour | ......... | G06F 17/5031 716/113 |
| 2010/0211922 A1* | 8/2010 | Sinha | ............... | G06F 17/5031 716/108 |
| 2010/0269083 A1* | 10/2010 | Sinha | ............... | G06F 17/5031 716/102 |
| 2014/0096099 A1* | 4/2014 | Phillips | ............... | G06F 17/5036 716/113 |

* cited by examiner

*Primary Examiner* — Vuthe Siek
(74) *Attorney, Agent, or Firm* — Andrews Kurth Kenyon LLP (57) ABSTRACT

Accurate timing analysis during STA is performed using detailed waveform information in addition to the traditional slew information. A waveform memory system efficiently stores the detailed waveforms that are used in, calculated during, and propagated throughout timing analysis for a circuit design. During the STA process, for multiple modeled stages of circuit design, a waveform including information detailing the form of the waveform is compressed, stored in, decompressed, and retrieved from a memory system. The memory system provides for storage efficiencies including long-term and short-term storage areas, multi-level storage, and separate storage for each view evaluated during the STA.

23 Claims, 11 Drawing Sheets

USING WAVEFORM PROPAGATION FOR ACCURATE DELAY CALCULATION

BACKGROUND

Aspects of the present invention relate generally to the field of circuit design and test, and more specifically to static timing analysis and simulation of electronics.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the devices that make up the components of the integrated circuit.

After or during the design and creation of an IC layout, validation, optimization, and verification operations are often performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are tested, for example using static timing analysis (STA) or gate level simulation (GLS). STA is used to model the expected timing of a digital circuit by estimating the expected delay within the circuit, for example, via the anticipated worst case signal path, without requiring a lengthy and cost prohibitive full simulation of the circuit.

During STA, a circuit design is reduced to a series of simplified models that are used to simulate the timing of the design. Then the STA considers a conservative scenario for the circuit using a model of the longest path in the design to evaluate the input and output signal slews and identify the delay. As part of the STA, a plurality of waveforms can be applied to the design models to evaluate the timing of the design. The waveforms applied during traditional STA are often represented by a single number—the slew of the waveform. However, waveform effects can cause significant errors in the delay calculations of the timing analysis. A waveform effect is the deviation of an actual waveform shape from an applied waveform. Waveform effects can be caused by wire resistance, nonlinear pin capacitance, back-Miller effect, crosstalk, a difference in the characteristics of the cells, etc. Additional information about the actual waveform is needed to counteract such inaccuracies. However, maintaining such waveform information for all pins of a design has conventionally been costly and impractical.

Therefore, there is a need in the art to accurately and efficiently propagate more comprehensive waveform information to account for waveform effects when simulating a circuit design.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Accurate timing analysis is performed using detailed waveform information in addition to the traditional slew information used during STA. A waveform memory system efficiently stores the detailed waveforms that are used in, calculated during, and propagated throughout timing analysis for a circuit design. During the STA process, for multiple modeled stages of circuit design, a waveform including information detailing the form of the waveform is stored in and retrieved from a memory system. The memory system provides for storage efficiencies including long-term and short-term storage areas, multi-level storage, separate storage for each view evaluated during the STA, etc. When being stored, the waveforms are compressed and during retrieval are decompressed.

Figure 1:
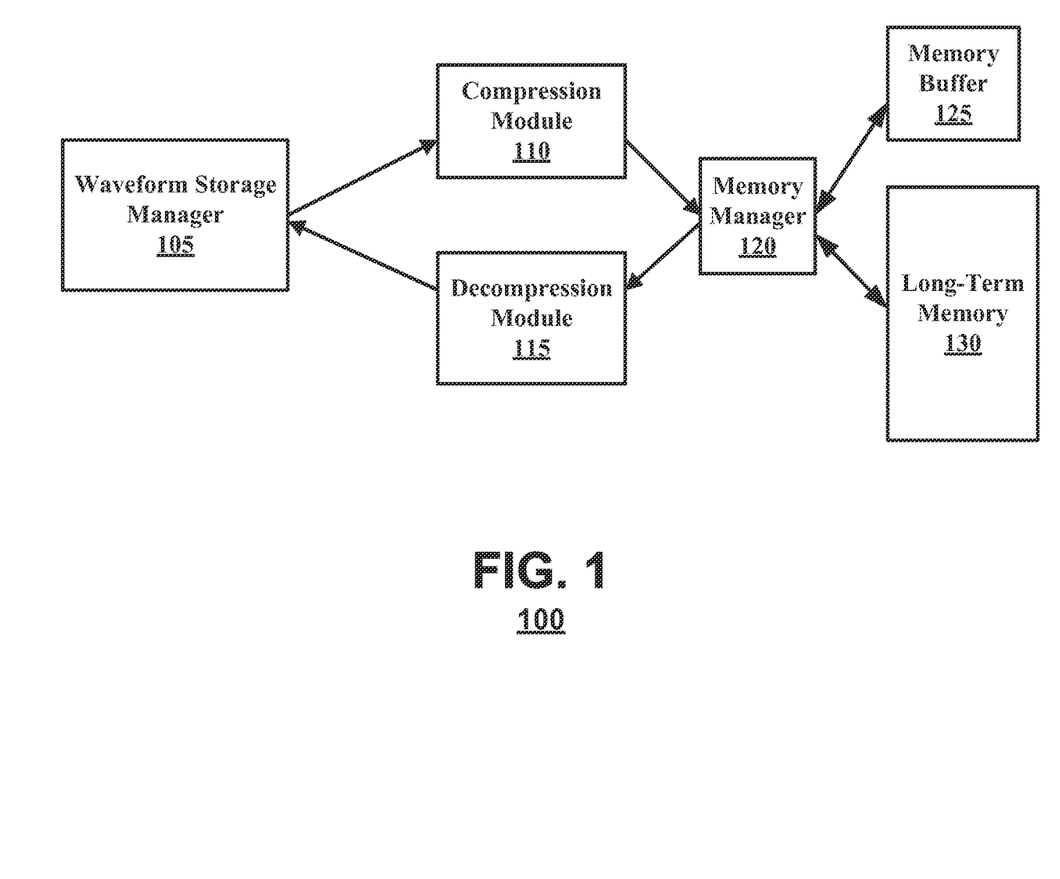
FIG. 1 is a simplified block diagram illustrating an exemplary waveform storage system according to an embodiment.

FIG. 1 is a simplified block diagram illustrating an exemplary waveform storage system 100 according to an embodiment. The waveform storage system 100 will have full storage of detailed waveforms for all pins in a circuit design undergoing test. According to an embodiment, the waveform storage system 100 will support both dense and sparse waveform storage. Dense waveform storage stores small and/or fixed-sized waveforms for every pin of the design. Such waveforms will be useful for delay calculation in block-based STA. Sparse waveform storage stores large and/or variable-sized waveforms that need not be propagated through a lengthy chain of elements. For example, sparse waveform storage can be used for evaluating timing pins having very noisy (non-monotonic) waveforms that require an accurate transition waveform representation. Sparse waveform storage will also support waveforms that can be used during glitch analysis where the specifics of the waveforms are not needed once the glitch has been evaluated.

As shown in FIG. 1, the waveform storage system 100 will include a waveform storage manager 105. The waveform storage manager 105 may assist in initialization of the waveform storage system 100, for example by creating and/or storing views, clusters, and threads for use during STA. Each stored view or cluster may be accessed independently and waveforms may not be propagated between clusters or views. The waveform storage manager 105 will additionally receive requests from a simulator executing an STA or other timing test. The requests may include requests to store a waveform calculated during a stage of the analysis, or requests to retrieve or restore a waveform to be applied during a stage of the analysis.

For each waveform stored in the waveform storage system 100, the stored waveform information may include waveform timing information, voltage vectors for the waveform, and the length of the waveform. Other information describing the waveform may also be stored as necessary to improve STA accuracy. According to an aspect of an embodiment, the waveform information may be simplified by capturing multiple waveforms at a specific time or specific voltage. Then each of those waveforms will share the same timing or voltage information.

The waveform storage manager 105 may additionally direct the operations of a compression module 110 and a decompression module 115. The compression module 110 will receive input waveforms from the waveform storage manager 105 and compress and/or merge the waveform for storage. The decompression module 115 will receive waveforms retrieved from storage and will decompress the compressed waveform or separate the merged waveforms as applicable. According to an embodiment, the decompression module 115 will reverse the processing performed by the compression module 110. According to an embodiment, no processing is needed at the decompression module 115, for example, for merged or mapped waveforms.

During compression, for any adjustments or ambiguities, the conservative, or worst case information may be preserved. Compression may additionally include conforming or merging certain waveforms to more consistent models. For example, a non-monotonic waveform may be compressed to a monotonic waveform. To perform such compression, a conservative monotonic representation of the non-monotonic waveform may be determined.

A conventional STA operates with slews and arrival times which approximate the transition waveforms. In block-based STA a merge operation (often referred to as a MIN or a MAX operation) is defined which is applied on two converging transitions (each represented by an arrival time and a slew) to give a worst-case transition (also represented by a slew and an arrival time). A traditional merge operation has two or more input slews, and a single slew as output that provides a conservative timing analysis. For example, for a min-delay calculation the merge operation may be defined as the minimum of the two or more input slews. Likewise, for a max-delay calculation, the merge operation may be defined as the maximum of the two or more input slews.

According to an embodiment, the traditional STA analysis is extended to include a waveform-based STA.

A waveform that is propagated along the timing graph as described herein is not simplified down to just the two parameters. However, more complex waveforms cannot be merged with a simple comparison. Therefore a merge operation is defined for two or more waveforms such that the resulting waveform is still a pessimistic estimate appropriate for STA.

Figure 2:
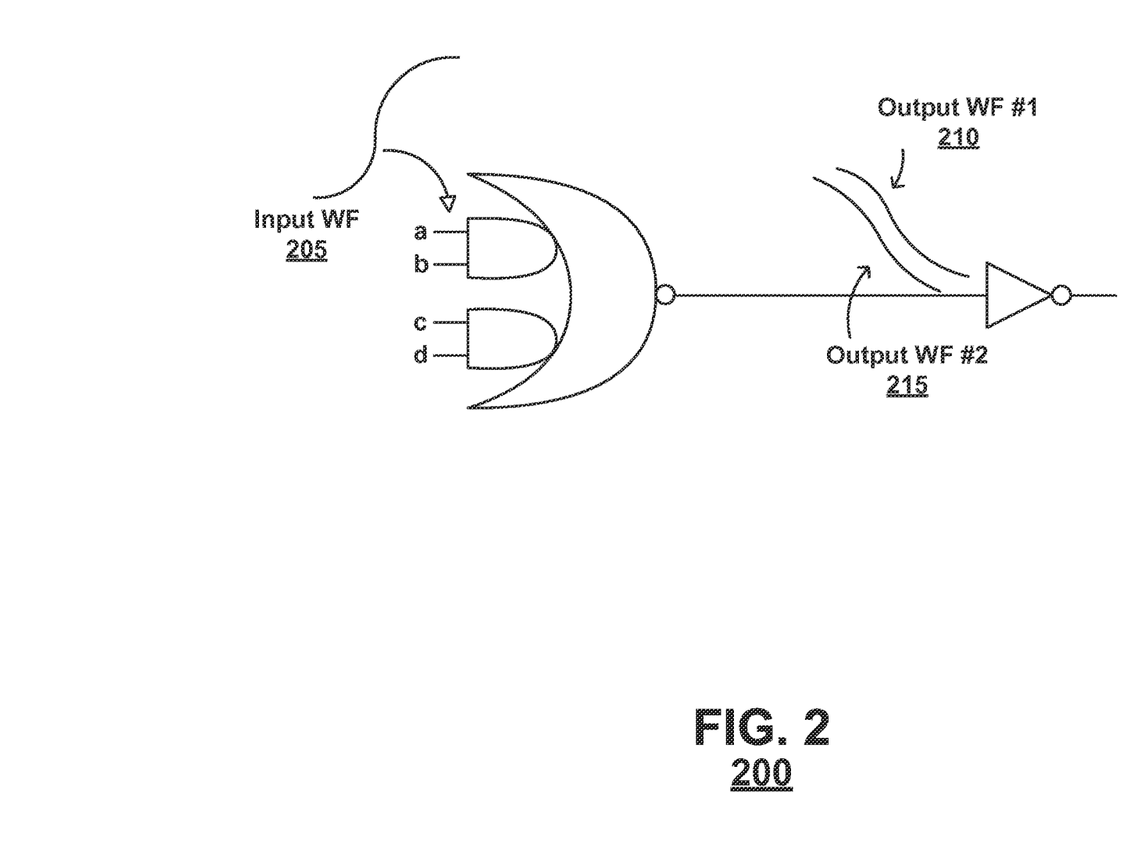
FIG. 2 illustrates an exemplary cell having a single input waveform and corresponding output waveforms according to an embodiment.
Figure 3:
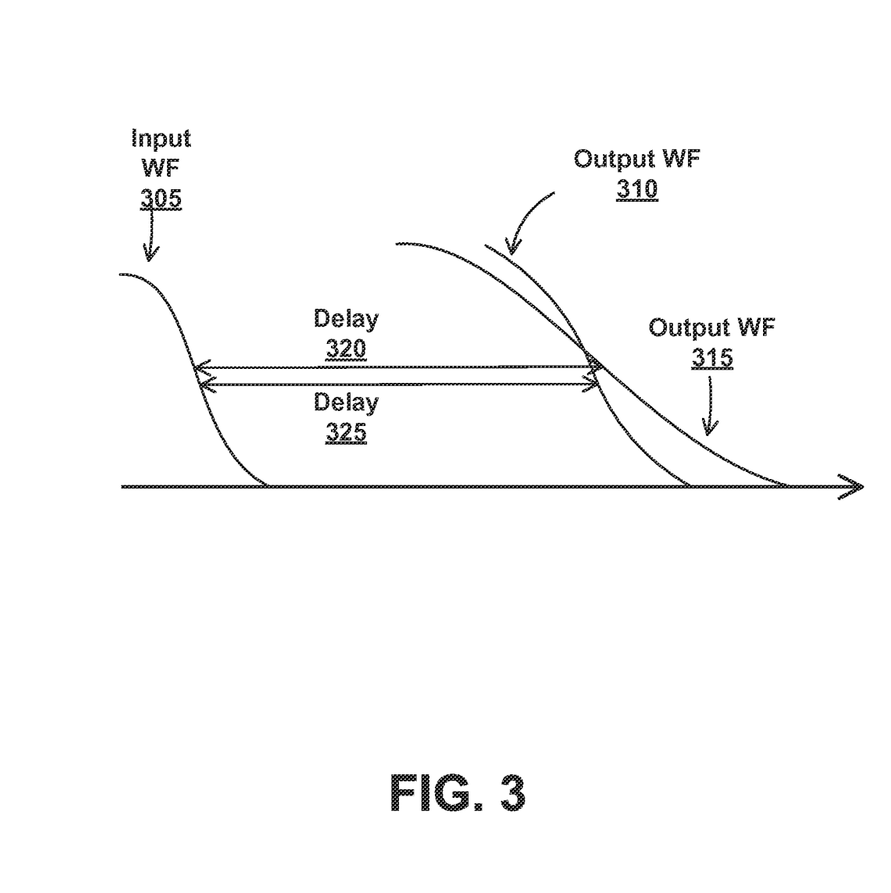
FIG. 3 illustrates an exemplary input waveform for a cell and corresponding output waveforms according to an embodiment.

According to an embodiment, during STA, two or more output waveforms, called parallel arcs, can occur on the same timing pin representing an input of a receiving gate. These parallel arcs may occur where different inputs on different pins of a cell create the same input and output waveforms for the cell. For example, in FIG. 2, a single input waveform 205 for the cell 200 can result in two or more parallel arcs 210 and 215 at the output of the cell 200. In this example, the cell implements the logic $y=not(a.b+b.c)$ and arc 210 may be the result of the input vector {b=1, c=0, d=1} whereas arc 215 may be the result of the input vector {b=1, c=0, d=0}. Different arcs may represent different delays and output slews, and therefore output waveforms will have different shapes and arrival times even though they are all triggered by the same input waveform. An example input waveform and multiple corresponding output waveforms are shown in FIG. 3. As shown in FIG. 3, a single input waveform 305 results in two different output waveforms 310, 315. Then the delay from input to output, 320 and 325, is different for each output waveform.

When multiple waveforms arrive at the same timing pin, the STA must perform a merge operation to generate a single, worst case waveform out of the potential multiple output waveforms. Such a merge operation must lead to a conservative analysis, which is the foundation of STA. The conservative analysis requires that the resulting "merged" waveform leads to higher (or smaller) delay than any of the waveforms being merged for a max-delay (or a min-delay) analysis.

Figure 4:
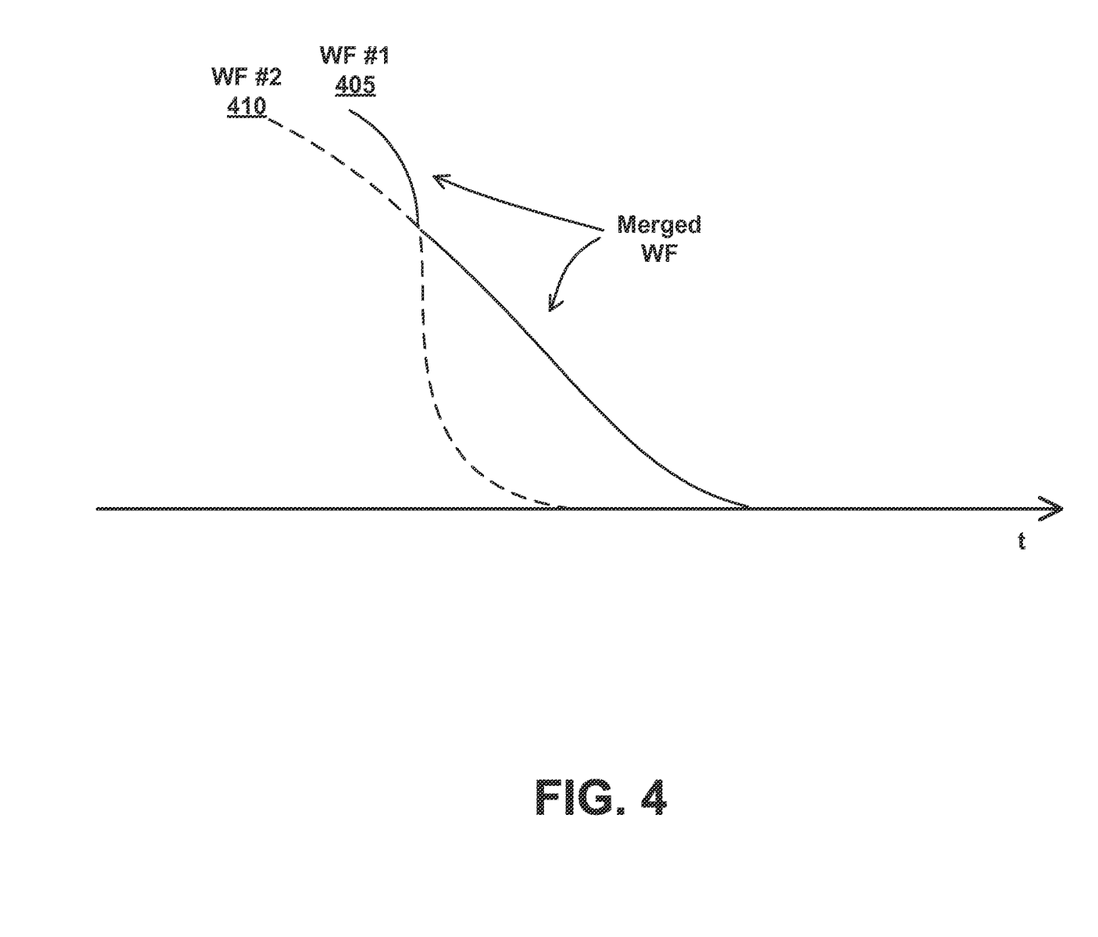
FIG. 4 illustrates an exemplary merge operation for multiple waveforms according to an embodiment.

FIG. 4 illustrates a merge operation for multiple waveforms in a max-delay analysis. To identify the worst-case waveform between two or more waveforms which are caused by parallel arcs, the worst case of each waveform forms a part of a new merged waveform. Since the output waveforms are triggered by the same input waveform they are already aligned relative to each other, and the worst-casing is performed by creating an upper envelope out of the two or more waveforms. As shown in FIG. 4, two output waveforms 405 and 410 are merged with the merged waveform computed from the upper-envelope of multiple output waveforms. The merged waveform is shown in solid lines, whereas the lower-envelope portions of the output waveforms that do not form part of the merged waveform are shown in dotted lines.

Similarly, for a min-delay analysis, the merge operation will identify the lower envelope of the parallel arcs as forming the merged waveform.

According to an embodiment, two or more output waveforms may also occur on the same output pin of any multi-input cell. In contrast to the parallel case, different output waveforms are triggered by different input waveforms.

Figure 5:
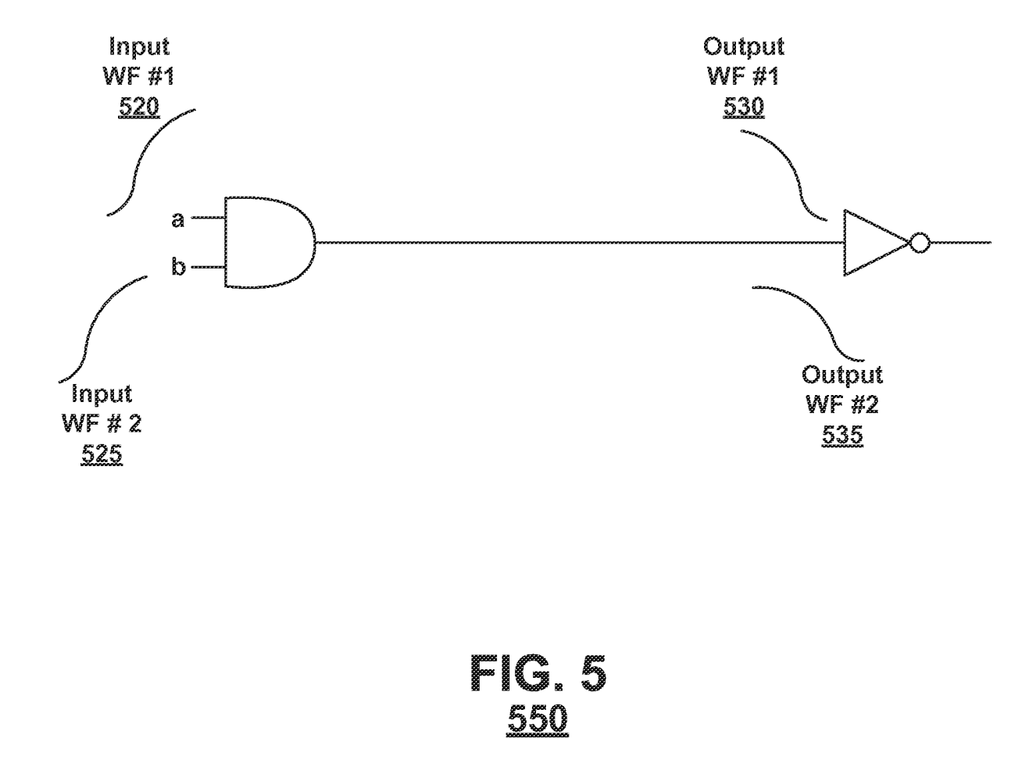
FIG. 5 illustrates an exemplary cell having multiple input waveforms and corresponding output waveforms according to an embodiment.

As shown in FIG. 5, two different input waveforms 520 and 525 to the cell 550 can result in two or more waveforms 530 and 535 at the output of the cell 550. In this example, arc 530 may be the result of {b=1} whereas arc 535 may be the result of {a=1} during a simulation.

Figure 6:
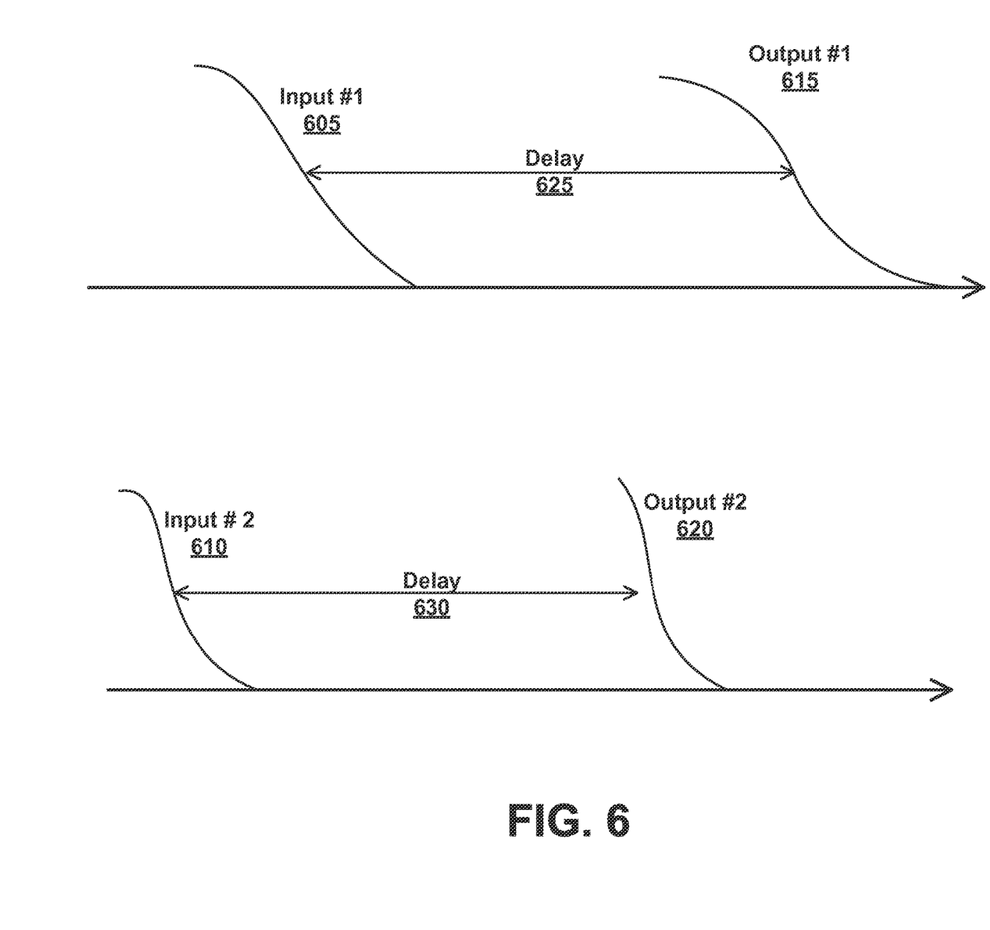
FIG. 6 illustrates exemplary input waveforms for a cell and corresponding output waveforms according to an embodiment.

FIG. 6 illustrates two input waveforms and two corresponding output waveforms. As shown in FIG. 6, different input waveforms 605, 610 result in two different output waveforms 615, 620. Then the delay from input to output, 625 and 630, is different for each output waveform.

Figure 7:
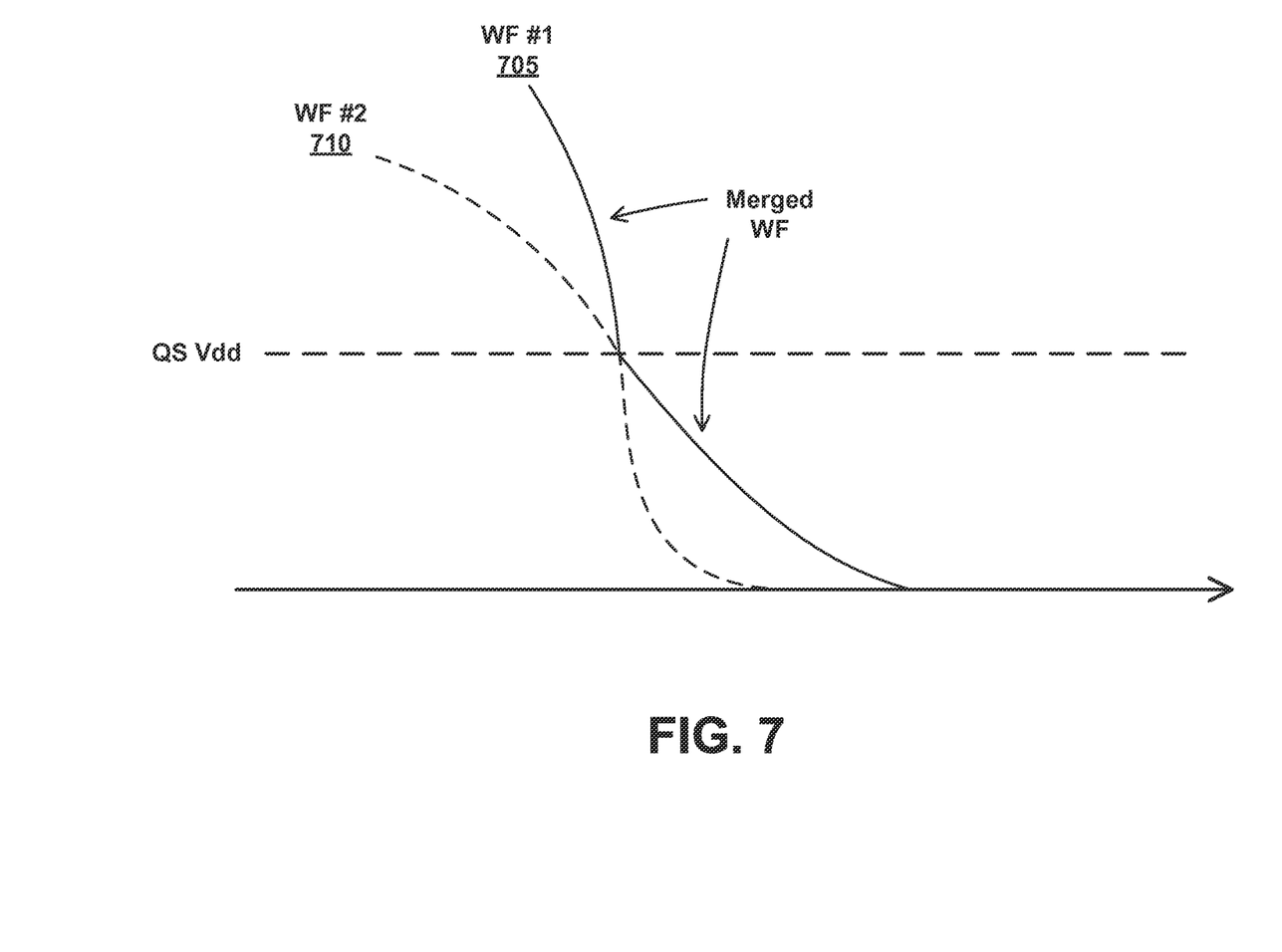
FIG. 7 illustrates an exemplary merge operation for multiple exemplary waveforms according to an embodiment.

To merge these two non-parallel output waveforms, since the output waveforms are triggered by different inputs and their correspondent waveforms, they are not aligned in time. In order to perform a merge operation, the output waveforms are aligned at their defined delay reference points. According to an embodiment, the reference point may be the time at which the waveform crosses 0.5Vdd. After the waveforms are aligned, the merged waveform is constructed using the upper- (or lower-) envelopes for the max (or min) delay analysis as previously described. As shown in FIG. 7, two output waveforms 705 and 710 are aligned at their respective reference points and are merged. The merged waveform is computed from the upper-envelope of multiple output waveforms. The merged waveform is shown in solid lines, whereas the lower-envelope portions of the output waveforms that do not form part of the merged waveform are shown in dotted lines.

Figure 8:
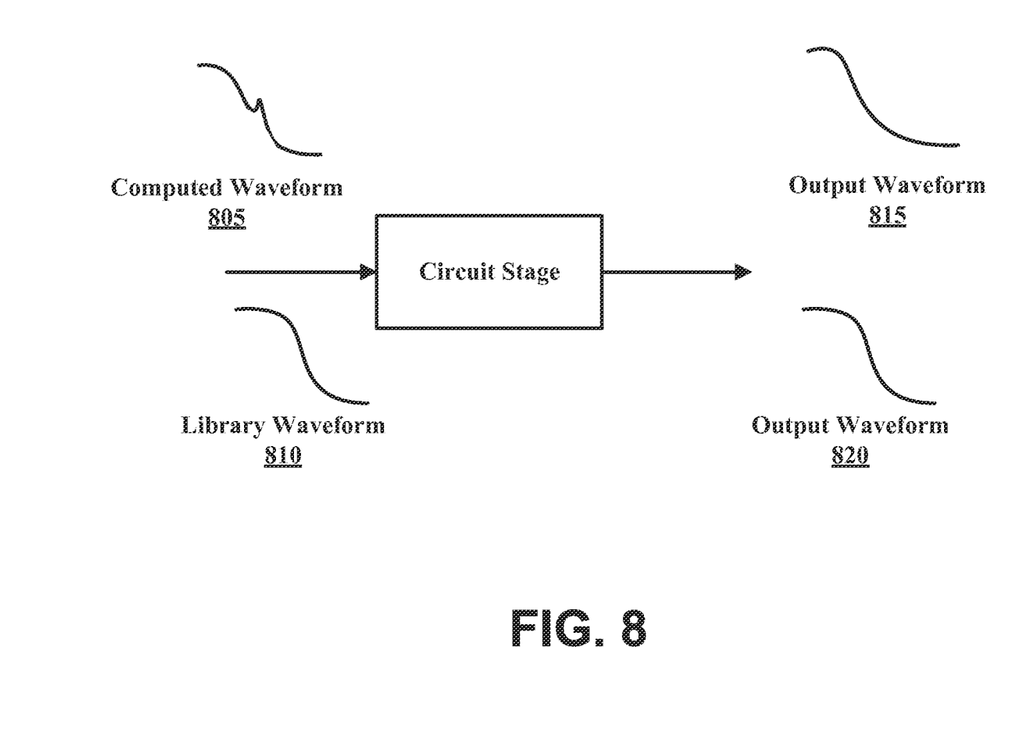
FIG. 8 illustrates an exemplary set of waveforms for waveform mapping according to an embodiment.

According to an embodiment, waveform compression may additionally include waveform mapping. FIG. 8 illustrates an exemplary set of waveforms for waveform mapping according to an embodiment. With waveform mapping, the input waveform 805 is replaced with a stored library waveform 810. The library waveform 810 will have a slew and shift chosen to drive a subsequent stage of the design 815 to the same or similar output waveform 820 having the same arrival time and slew, as the output waveform 820 that would result from using the input waveform 805. This will replace the actual waveform computed during the analysis with a functionally identical representation chosen from available stored library waveforms. Then the waveform stored in place of the input waveform will be simplified to reduce the necessary storage.

Returning to FIG. 1, a memory manager 120 will receive the compressed waveform from the compression module 110 and will determine where in memory the waveform should be stored. For example, the waveform may be stored in a cache or memory buffer 125 for short-term storage and retrieval, or in long-term storage 130, for example on a disk or a database. The memory manager 120 may determine the storage location based on a number of factors. For example, if multi-level storage is being used, a single level of the design may be accessed at a time and the waveforms for any elements in the single level of the design may be accessed in any order. Then, the waveforms for the active level can be stored in the memory buffer for short-term retrieval until a new level is under test. Then the waveforms for the current level will be stored in long-term storage and the waveforms for the new level may be brought to the memory buffer for quick access.

Similarly, waveforms for the design may be clustered or cached by view for use in multi-view timing analysis. For example, the behavior of an electronic circuit is often dependent on various conditions such as temperature or local voltage variations. Therefore circuit designers typically verify their design under several different conditions, or views, by performing STA for each of the potential different conditions. Each view may have multiple factors, including a constraint file, a library file, and parameters for RC reduction. Then to complete the STA, the timing delay of the circuit must be separately calculated for each set of factors, for example, for each unique combination of RC reduction, library file, and input waveform. The waveforms for each view may then be clustered or cached together for ease of access during STA of the respective view.

Although described primarily with reference to a single access application, the memory storage system may be accessible by multiple threads simultaneously.

Figure 9:
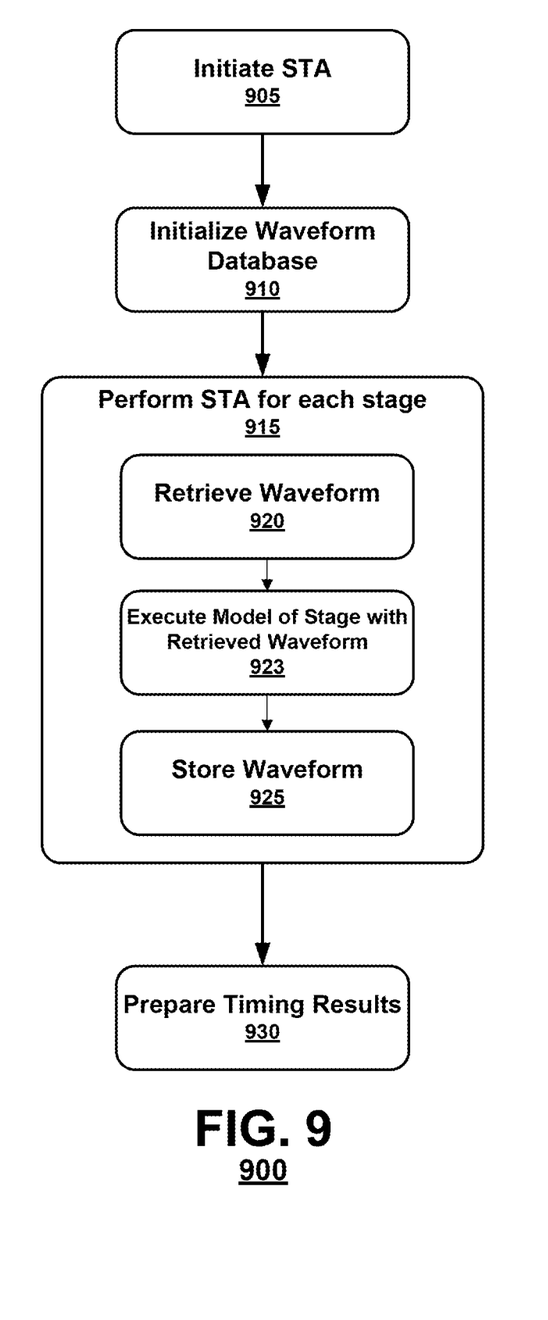
FIG. 9 illustrates an exemplary method for static timing analysis using waveform propagation according to an embodiment.

FIG. 9 illustrates an exemplary method for STA using waveform propagation according to an embodiment. As shown in FIG. 9, once STA is initiated for a circuit design (block 905), the waveform database will be initialized (block 910). As previously noted, the waveform database may be initialized to identify a plurality of library waveforms and may cluster the waveforms and design elements by view, corner, design level, or other organizational scheme. Then, the STA will be performed for each stage in the circuit design (block 915). In some embodiments, the STA will be performed by a subset of the circuit design specified by requests received from a simulator. During STA, for every input to a stage of the circuit design, a waveform will be retrieved from the waveform database (block 920). As previously noted, retrieval may include accessing one or more levels of cache, accessing long-term memory, or accessing a memory buffer and may include decompression of a retrieved waveform. The circuit design modeled by the stage under test is executed using the retrieved waveform as input to the stage (block 923). Once the timing analysis has been completed for the stage, the output waveform will be stored to the waveform database (block 925). The stored waveform may be subsequently retrieved for use in a later stage, thereby propagating the detailed waveform through a chain of circuit elements or circuit stages. As previously noted, storing received waveforms may include accessing one or more levels of cache, accessing long-term memory, or accessing a memory buffer and may include compressing, merging, or waveform mapping a received waveform. The stored waveforms may then be used to develop a final timing analysis for the circuit design (block 930).

Figure 10:
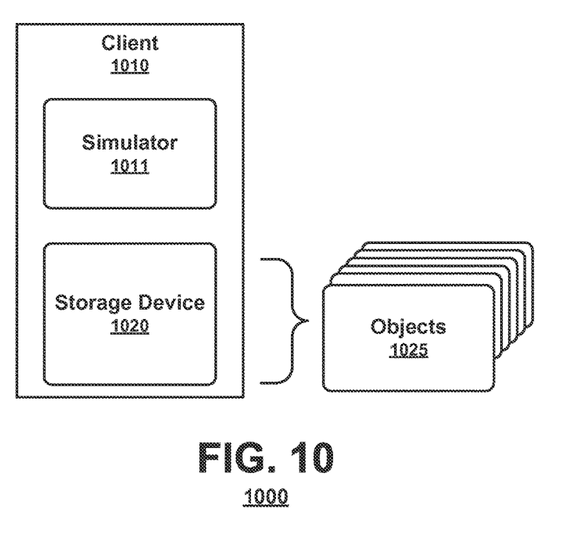
FIG. 10 is a simple block diagram illustrating components of an exemplary system according to an embodiment.

A user or designer may access a simulator interface to perform STA for a design in a standalone client system, client-server environment, or a networked environment. FIG. 10 is a simple block diagram illustrating components of an exemplary system 1000 according to an embodiment. As shown in FIG. 10, a system 1000 may comprise a client 1010 executing a simulator 1011 and having a memory storage 1020. The client 1010 may be any computing system that executes a simulator 1011 or otherwise facilitates access to memory storage 1020, for example a personal computer. The client 1010 may include a processor that performs a method in accordance with the disclosed embodiments. Such a client would be part of an overall simulation system in accordance with the disclosed embodiments.

Hardware models, instruction sets, software packages, instances of the modeled components, state information for the modeled components, timing files, netlists, waveforms, and other objects 1025 used by the simulator 1011 may be stored in memory storage 1020. A user may access the objects 1025 stored in memory storage 1020 with the client 1010 via the simulator 1011, where the simulator 1011 is capable of accessing memory storage 1020 and displaying the objects 1025 and the data associated with the simulation. The simulator 1011 may include a user interface, for example a program, application or middleware that acts as a frontend to and facilitates access to objects in memory storage 1020. The simulator 1011 may facilitate executing an STA using the tools and procedures described herein. The user may interact with the simulator 1011 through a number of input devices, such as by inputting a selection as with a mouse or inputting a request as with a keyboard. The user may observe the simulation results on an output device or display. The simulator 1011 may run in an application window controlled by the user.

As shown in FIG. 10, a client 1010 may be a stand-alone system, as may be of particular interest where the components being simulated are highly confidential. Additionally, according to an aspect of an embodiment as shown in FIG. 11, a client 1110 may be part of a networked environment.

Figure 11:
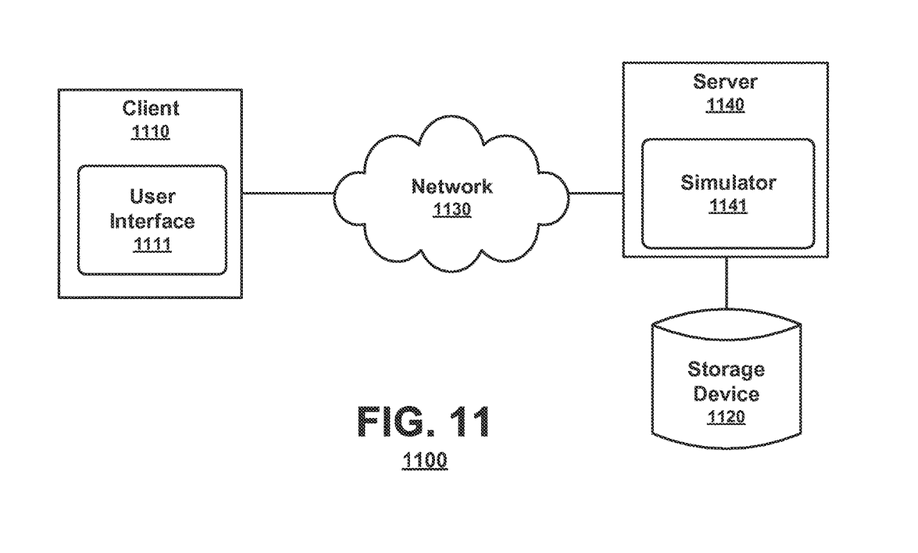
FIG. 11 is a simple block diagram illustrating components of an exemplary system according to an embodiment.

FIG. 11 is a simple block diagram illustrating components of an exemplary system 1100 according to an embodiment. As shown in FIG. 11, system 1100 may include a client 1110 having a user interface 1111. The client 1110 may be connected to a server 1140 via a network 1130. The simulator 1141, which in this embodiment is located at server 1140, may have access to storage device 1120 storing waveforms and other objects utilized by the simulator 1141. The server 1140 may include a processor that performs a method in accordance with the disclosed embodiments. Such a server then would be part of an overall simulation system in accordance with the disclosed embodiments.

A user may access a simulator 1141 at the server 1140 via the client 1110 having a user interface 1111 capable of accessing and displaying the results of the simulation of the design. The client 1110 may be any computing system that facilitates the user accessing storage device 1120, for example a personal computer. The network 1130 may be a wired or wireless network that may include a local area network (LAN), a wireless network, the Internet, or any other network available for accessing storage device 1120 from the client 1110.

The server 1140 may be a network server accessible to the client 1110 via the network 1130 that may manage access to storage device 1120. The user interface 1111 may receive instructions regarding a simulation from the user and, utilizing the objects stored in memory storage 1120, facilitate a display of the simulation or the information gathered during the simulation. Multiple different clients (not shown) may access storage device 1120 via the network 1130 and request access to the objects stored therein.

In another networked environment, the simulator may be executed on a network capable client and access the models, packages and other objects stored in one or more storage devices via a network and communications server.

Figure 12:
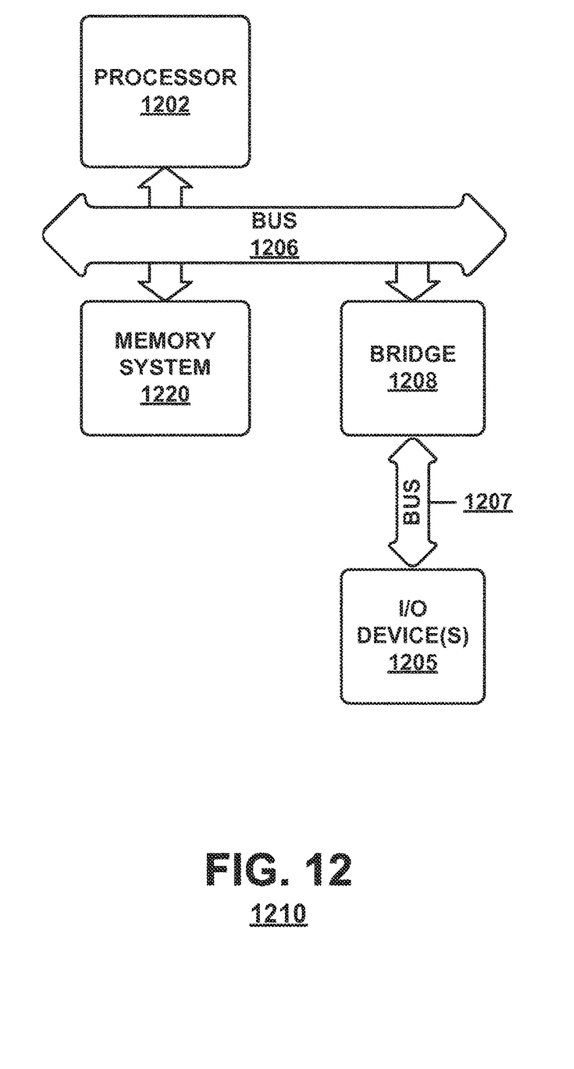
FIG. 12 is a simple block diagram illustrating components of an exemplary client according to an embodiment.

FIG. 12 is a simple block diagram illustrating components of an exemplary client 1210 according to an embodiment of the present invention. As shown in FIG. 12, the client 1210 configured to execute the simulator as described herein may include a processor 1202, a memory system 1220 and one or more input/output (I/O) devices 1205 in communication. The communication can be implemented in a variety of ways and may include one or more computer buses 1206, 1207 and/or bridge devices 1208 as shown in FIG. 12. The I/O devices 1205 can include network adapters and/or mass storage devices from which the client 1210 can receive commands for executing the simulation.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIG. 9 do not necessarily imply a particular order or sequence of events, nor are they intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for a static timing analysis of an integrated circuit design, the method comprising:
on a computer device having a processor configured to simulate, with a simulator, timing of the circuit design:
for each stage from a plurality of stages of the circuit design:
retrieving, from a memory, a single waveform having timing and voltage information,
modeling execution of the stage using the retrieved single waveform as an input into the stage,
when the modeling execution of the stage results in two or more waveforms at a same timing pin, generating a merged waveform based on the two or more waveforms, and
storing an output waveform of the modeled stage in the memory for later use; and
simulating, with the simulator, the static timing analysis for the circuit design based on the modeled stages.

2. The method of claim 1, wherein said retrieving comprises decompressing the waveform having timing and voltage information.

3. The method of claim 1, wherein said storing comprises compressing the output waveform.

4. The method of claim 1, wherein said storing comprises storing a simplified previously stored library waveform as the output waveform.

5. The method of claim 1, wherein for a plurality of levels of the circuit design, each level is stored separately in the memory and only one level at a time is accessible.

6. The method of claim 5, wherein an accessible level is stored in a memory buffer and waveforms are retrieved from and stored to the memory buffer.

7. The method of claim 1, wherein a plurality of threads are used simultaneously to simulate the circuit design.

8. The method of claim 1, wherein the merged waveform is generated to account for a worst case of each of the two or more waveforms.

9. The method of claim 8, wherein the worst case of each of the two or more waveforms is established based on a max-delay analysis.

10. The method of claim 8, wherein the worst case of each of the two or more waveforms is established based on a min-delay analysis.

11. A method for a static timing analysis of an integrated circuit design, the method comprising:

on a computer device having a processor configured to simulate timing of the circuit design:

for each stage from a plurality of stages of the circuit design:

retrieving, from a memory, a waveform having timing and voltage information, modeling execution of the stage using the retrieved waveform as an input into the stage, merging a plurality of potential output waveforms to calculate the output waveform of the modeled stage, the merging including aligning the plurality of potential output waveforms at a reference point and capturing an upper- or lower-envelope of the aligned waveforms as the calculated output waveform, and storing an output waveform of the modeled stage in the memory for later use; and performing the static timing analysis for the circuit design based on the plurality of modeled stages.

12. The method of claim 11, wherein the reference point occurs at a time corresponding to a voltage level of each of the plurality of potential output waveforms.

13. The method of claim 12, wherein the voltage level is $0.5*V_{DD}$.

14. A non-transitory computer readable medium storing instructions that when executed by a processor perform a method of simulating a static timing analysis for an integrated circuit design, the method comprising:

for each stage from a plurality of stages of the design:

retrieving, from a memory, a single waveform having timing and voltage information.

modeling execution of the stage using the retrieved single waveform as an input into the stage, when the modeling execution of the stage results in two or more waveforms at a same timing pin, generating a merged waveform based on the two or more waveforms, and storing an output waveform of the modeled stage in the memory for later use; and simulating, with a simulator, the static timing analysis for the circuit design based on the modeled stages.

15. The non-transitory computer readable medium of claim 14, wherein said retrieving comprises decompressing the waveform having timing and voltage information.

16. The non-transitory computer readable medium of claim 14, wherein said storing comprises compressing the output waveform.

17. The non-transitory computer readable medium of claim 14, wherein said storing comprises storing a simplified previously stored library waveform as the output waveform.

18. A non-transitory computer readable medium storing instructions that when executed by a processor perform a method of performing a static timing analysis for an integrated circuit design, the method comprising:

for each stage from a plurality of stages of the design:

retrieving, from a memory, a waveform having timing and voltage information, modeling execution of the stage using the retrieved waveform as an input into the stage, merging a plurality of potential output waveforms to calculate the output waveform of the modeled stage, the merging including aligning the plurality of potential output waveforms at a reference point and capturing an upper- or lower- envelope of the aligned waveforms as the calculated output waveform, and storing an output waveform of the modeled stage in the memory for later use; and performing the static timing analysis for the circuit design based on the modeled stages.

19. A system comprising:

a memory to store a plurality of waveforms; and a processor configured to simulate, with a simulator, a static timing analysis for an integrated circuit design by:

for each stage from a plurality of stages of the design:

retrieving, from the memory, a single waveform having timing and voltage information, modeling execution of the stage using the retrieved single waveform as an input into the stage, when the modeling execution of the stage results in two or more waveforms at a same timing pin, generating a merged waveform based on the two or more waveforms, and storing an output waveform of the modeled stage in the memory for later use; and simulating, with the simulator, the static timing analysis for the circuit design based on the modeled stages.

20. The system of claim 19, wherein said processor retrieves the waveform having timing and voltage information by decompressing it.

21. The system of claim 19, wherein said processor stores the output waveform by compressing it.

22. The system of claim 19, wherein said processor stores a simplified previously stored library waveform as the output waveform.

23. A system comprising:

a memory to store a plurality of waveforms; and a processor configured to perform a static timing analysis for an integrated circuit design by:

for each stage from a plurality of stages of the design:

retrieving, from the memory, a waveform having timing and voltage information, modeling execution of the stage using the retrieved waveform as an input into the stage, merging a plurality of potential output waveforms to calculate the output waveform of the modeled stage, the merge including aligning the plurality of potential output waveforms at a reference point and capturing an upper- or lower-envelope of the aligned waveforms as the calculated output waveform, and storing an output waveform of the modeled stage in the memory for later use; and performing the static timing analysis for the circuit design based on the modeled stages.

* * * * *